(12) United States Patent
Abel et al.

(10) Patent No.: US 10,508,315 B2
(45) Date of Patent: Dec. 17, 2019

(54) BURNER-LANCE UNIT

(71) Applicant: Primetals Technologies Austria GmbH, Linz (AT)

(72) Inventors: Markus Abel, Kehl-Bodersweier (DE); Hannes Beile, Ettenheim (DE); Markus Dorndorf, Baden-Baden (DE); Alexander Müller, Offenburg (DE); Ralf Pitz, Kehl (DE)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 376 days.

(21) Appl. No.: 15/328,712

(22) PCT Filed: Aug. 4, 2015

(86) PCT No.: PCT/EP2015/067949
§ 371 (c)(1),
(2) Date: Jan. 24, 2017

(87) PCT Pub. No.: WO2016/020376
PCT Pub. Date: Feb. 11, 2016

(65) Prior Publication Data
US 2017/0218470 A1     Aug. 3, 2017

(30) Foreign Application Priority Data
Aug. 8, 2014   (DE) .......................... 10 2014 215 794

(51) Int. Cl.
*C21C 5/52*     (2006.01)
*C21C 5/46*     (2006.01)
(Continued)

(52) U.S. Cl.
CPC .......... *C21C 5/5217* (2013.01); *C21C 5/4606* (2013.01); *F27B 3/205* (2013.01);
(Continued)

(58) Field of Classification Search
CPC ................................................... C21C 5/4606
See application file for complete search history.

(56) References Cited

U.S. PATENT DOCUMENTS

| 5,559,375 A | 9/1996 | Jo et al. |
| 2003/0075843 A1* | 4/2003 | Wunsche ............. C21C 5/4606 266/225 |

(Continued)

FOREIGN PATENT DOCUMENTS

| DE | 196 37 246 A1 | 2/1998 |
| DE | 196 40 491 A1 | 4/1998 |

(Continued)

OTHER PUBLICATIONS

International Search Report dated Sep. 20, 2016 issued in corresponding International Patent Application No. PCT/EP/2015/067949.

(Continued)

*Primary Examiner* — Scott R Kastler
(74) *Attorney, Agent, or Firm* — Ostrolenk Faber LLP

(57) ABSTRACT

A burner-lance unit (1) includes at least two gas connections (2a, 2b, 2c), a burner tube (3), and a lance tube (4) that is placed concentrically in the burner tube (3). The burner tube (3) and the lance tube (4) both have a gas inlet end and a gas outlet end (15). The lance tube (4) has a de Laval nozzle (4a) at the gas outlet end thereof. The de Laval nozzle (4a) is releasably connected to the lance tube (4). The burner tube (3) has a burner nozzle (3a) which is releasably connected to the burner tube (3).

6 Claims, 3 Drawing Sheets

(51) Int. Cl.
*F27B 3/20* (2006.01)
*F27B 3/22* (2006.01)
*F27D 3/16* (2006.01)
*F27D 3/18* (2006.01)
*F27D 99/00* (2010.01)

(52) U.S. Cl.
CPC ................ *F27B 3/22* (2013.01); *F27D 3/16* (2013.01); *F27D 3/18* (2013.01); *F27D 99/0033* (2013.01); *F27D 2003/169* (2013.01); *Y02P 10/216* (2015.11)

(56) References Cited

U.S. PATENT DOCUMENTS

| | | |
|---|---|---|
| 2012/0140787 A1 | 6/2012 | Abel et al. |
| 2013/0119168 A1 | 5/2013 | Odenthal et al. |
| 2014/0367499 A1 | 12/2014 | Odenthal et al. |
| 2017/0218470 A1* | 8/2017 | Abel ............... C21C 5/4606 |

FOREIGN PATENT DOCUMENTS

| | | |
|---|---|---|
| WO | WO 96/06954 A1 | 5/1996 |
| WO | WO 99/54511 | 10/1999 |
| WO | WO 02/44617 A1 | 6/2002 |
| WO | WO 2011/018403 A1 | 2/2011 |
| WO | WO 2011/120976 A1 | 10/2011 |
| WO | WO 2012/089754 A2 | 7/2012 |

OTHER PUBLICATIONS

Written Opinion dated Sep. 20, 2016 issued in corresponding International Patent Application No. PCT/EP/2015/067949.
German Search Report dated May 29, 2015 issued in corresponding German Patent application No. 10 2014 215 794.3.

* cited by examiner

BURNER-LANCE UNIT

CROSS-REFERENCE TO RELATED APPLICATIONS

The present application is a 35 U.S.C. §§ 371 national phase conversion of PCT/EP2015/067949, filed Aug. 4, 2015, which claims priority of German Patent Application No. 10 2014 215 794.3, filed Aug. 8, 2014, the contents of which are incorporated by reference herein. The PCT International Application was published in the German language.

TECHNICAL BACKGROUND

The invention relates to a burner-lance unit comprising at least two gas connections, a burner tube, and a lance tube which is arranged within the burner tube and is concentric thereto, wherein each of the burner tube and the lance tube has a gas inlet end and a gas outlet end, and wherein the gas outlet end of the lance tube has a de Laval nozzle which is releasably connected to the lance tube. The invention furthermore relates to a furnace having at least one such burner-lance unit.

Such a burner-lance unit is known from DE 196 37 246 A1. It is formed by a combination of a burner and a lance, wherein operation of such a unit can be carried out either in burner mode or in lance mode.

Metallurgical furnaces, especially arc furnaces, preferably have burners which are installed on the furnace wall and are directed onto the surface of the molten metal in the furnace chamber in order to introduce energy into the molten metal or in order to accelerate the melting process in the furnace. A flame is formed in burner mode by such a burner. In the process, fuel, especially natural gas, oil and the like, is combusted with the addition of a combustible gas containing oxygen.

Lances are customarily introduced into the furnace chamber locally and frequently at limited times in order to feed for example gases, such as oxygen for oxidizing the molten metal, to carry out measurements, or to take samples.

As in a conventional burner, a flame is also created in a burner-lance unit when it is operated in burner mode and energy is introduced into the furnace chamber. After shutting off the burner mode, i.e. shutting off the flame, the burner-lance unit can be used as a lance via which a gas flow can be blown into the furnace chamber and, if necessary, measurements can be carried out on the molten metal. To this end, gas connections for at least one gas which is to be blown in in lance mode are provided on a burner-lance unit in addition to the connections for fuel and combustible gas which are provided on a conventional burner. By the use and modification of a conventional burner to form a burner-lance unit in such a way that this can also be used as a lance, no additional cost and no space requirement for additional devices therefore arises.

In the lance mode, the interior of the burner-lance unit can be used in order to carry out a temperature measurement on the molten metal in the furnace chamber by means of a temperature measuring unit. In this case, gas to be blown in at supersonic speed in lance mode is especially injected into the furnace chamber in the direction of the molten metal in order to blow away slag which forms on the molten metal and to locally expose the surface of the molten metal for a contactless temperature measurement. In order to create a gas flow which is to be blown in at supersonic speed, the burner-lance unit especially has a de Laval nozzle into which the gas is fed, at several bar pressure.

A burner-lance unit with a temperature measuring device is described in WO 2011/018 403 A1.

A burner-lance unit, which comprises at least two gas connections, a burner tube and a lance tube which is arranged within this burner tube concentrically thereto, is known from U.S. Pat. No. 5,599,375 A. The burner tube and the lance tube have in each case a gas inlet end and a gas outlet end. The lance tube at its gas outlet end has a de Laval nozzle. A head element, which forms a combustion space and is water cooled, is flanged onto the burner tube. The head element has discharge openings through which the combustible gas which is directed in the burner tube can flow into the combustion space.

The standard operation of a metallurgical furnace having at least one burner-lance unit is customarily carried out in this case as follows:

During the feeding of the material to be melted into the furnace chamber the burner-lance unit is operated with a protected flame in order to keep the opening of the burner-lance unit which is directed towards the furnace chamber clear. The burner-lance unit is then operated in burner mode and the output is increased in steps in order to support melting of the material in the furnace chamber. As soon as there is a sufficient quantity of molten metal, the burner-lance unit is switched into the lance mode and oxygen, or gas containing oxygen, is injected into the furnace chamber at supersonic speed for oxidizing the molten metal. During lance mode, the protected flame is customarily burnt again, enveloping the injected gas flow. As soon as the furnace can be tapped off, i.e. as soon as the furnace chamber can be emptied, the gas flow is shut off, the burner-lance unit is further operated with the forming of the protected flame, and the molten metal is withdrawn. The standard operation now begins from new with the feeding of material, which is to be melted, into the furnace chamber.

The side of the burner-lance unit which projects into the chamber of the furnace, the so-called "hot" end, is in this case subjected to sharp temperature changes and also to high mechanical and corrosive loads. Especially the end region, at which the gas outlet openings of the burner tube and of the lance tube are located, becomes very hot and therefore particularly severely stressed. The service life of a burner-lance unit therefore mainly depends on the state of this end region.

On account of the specific type of construction of the de Laval nozzle, this nozzle is produced as a separate part and is then releasably connected to the lance tube so that in the event of excessive wear, this nozzle can be exchanged. In the event of wear in the region of the gas outlet end of the burner tube, this tube is exchanged completely for a new burner tube, wherein the burner-lance unit has to be totally dismantled in a time-intensive maintenance process and then reassembled again.

A burner-lance unit, which has two gas connections and a lance tube, is known from WO 2012/089 754 A2, wherein the lance tube has a gas inlet end and a gas outlet end. The lance tube at its gas outlet end has a de Laval nozzle. The lance tube is encompassed by a cooling tube.

A plurality of embodiments are known from WO 96/06954 A1.

In one embodiment, WO 96/06954 A1 shows a burner-lance unit which has at least two gas connections, a burner tube and a lance tube which is concentrically arranged within the burner tube, wherein each of the burner tube and the lance tube has a gas inlet end and a gas outlet end, wherein the lance tube has a de Laval nozzle at its gas outlet end, and furthermore the burner tube has a burner nozzle which is releasably connected to the burner tube.

In another embodiment, WO 96/06954 A1 shows a burner-lance unit which comprises at least two gas connections, a burner tube and a lance tube which is arranged within this burner tube concentrically thereto. Each of the burner tube and the lance tube has a gas inlet end and a gas outlet end. The burner tube is arranged concentrically inside a cooling tube.

In yet another embodiment, WO 96/06954 A1 shows a burner-lance unit in which an inner, central tube is concentrically encompassed by two further tubes. The innermost tube carries water, and the two outer tubes carry an oxygen-rich gas and a liquid combustible material. Positioned upstream of the tubes is a combustion chamber which is described as being water cooled.

In yet another embodiment, WO 96/06954 A1 shows a burner-lance unit which comprises at least two gas connections, a burner tube and a lance tube which is arranged within this burner tube concentrically thereto. Each of the burner tube and the lance tube has a gas inlet end and a gas outlet end. The burner tube is arranged inside a cooling tube. The burner tube has a burner nozzle which is encompassed by the cooling tube.

A burner-lance unit comprising at least two gas connections, a burner tube and a lance tube which is arranged concentrically to the burner tube, is known from WO 02/44617 A1. Each of the burner tube and the lance tube has a gas inlet end and a gas outlet end.

A burner-lance unit comprising at least two gas connections, a burner tube and a lance tube which is concentrically arranged within the burner tube, is known from WO 99/54511 A1. Each of the burner tube and the lance tube has a gas inlet end and a gas outlet end. The lance tube at its gas outlet end has a de Laval nozzle.

SUMMARY OF THE INVENTION

It is the object of the invention to provide a more maintenance-friendly burner-lance unit.

For the burner-lance unit, comprising at least two gas connections, a burner tube and a lance tube which is arranged concentrically within this burner tube, the object is achieved by each of the burner tube and the lance tube having a gas inlet end and a gas outlet end,
by the gas outlet end of the lance tube having a de Laval nozzle which is releasably connected to the lance tube,
by the burner tube having a burner nozzle which is encompassed by a cooling tube and releasably connected to the burner tube,
by a releasable connection between the burner tube and the burner nozzle comprising a screwed connection,
by a releasable connection between the lance tube and the de Laval nozzle comprising a screwed connection,
by a screwed connection between the burner tube and the burner nozzle comprising a male thread arranged on the burner nozzle and extending concentrically around the longitudinal axis of the lance tube, and a female thread arranged on the burner tube and interacting with the male thread, and
by a screwed connection between the lance tube and the de Laval nozzle comprising a male thread arranged on the de Laval nozzle and extending concentrically around the longitudinal axis of the lance tube, and a female thread arranged on the lance tube and interacting with this male thread.

Such an embodiment of the burner-lance unit enables exchange of the burner nozzle without having to exchange the burner tube at the same time. Exchange of the burner nozzle can be carried out without any problem, particularly without the burner-lance unit having to be totally dismantled. The maintenance process can be carried out quickly and inexpensively with low utilization of personnel. The qualification of the maintenance personnel may be low since the construction of the burner-lance unit does not have to be understood in detail as such. According to its requirement and wear state, the burner lance unit can be completely exchanged at a time independently of the de Laval nozzle or at the same time with the de Laval nozzle.

The cooling tube preferably has cooling medium passages, which are connected to at least two cooling medium connections. The cooling tube reduces the thermal load of the burner tube and of the lance tube and dissipates thermal energy from the extremely wear-afflicted end of the burner-lance unit in order to extend the times between maintenance cycles.

It advantageous if an outside diameter and/or an inside diameter of the burner nozzle and/or of the de Laval nozzle has at least one indentation and/or at least one projection which can be brought into engagement with a key unit for releasing the burner nozzle and/or the de Laval nozzle. The key unit is a tool for removing the burner nozzle and/or the de Laval nozzle from the burner tube or lance tube respective and for installing a corresponding replacement part. The maintenance process can consequently be carried out in an accelerated manner.

A furnace, especially a metallurgical furnace, which has a furnace chamber and at least one burner-lance unit according to the invention, has proved to be successful, wherein the gas outlet ends of the burner tube and of the lance tube are arranged in a manner pointing in the direction of the furnace chamber.

The metallurgical furnace is especially an arc furnace and the like.

BRIEF DESCRIPTION OF THE DRAWINGS

FIG. 1 shows a burner-lance unit in a three-dimensional view;

FIG. 2 shows a section through the hot end of the burner-lance unit according to FIG. 1;

FIG. 3 shows a rigid connection between a de Laval nozzle and a burner nozzle; and FIG. 4 schematically shows a furnace having a burner-lance unit.

DESCRIPTION OF AN EMBODIMENT

Figure 1:
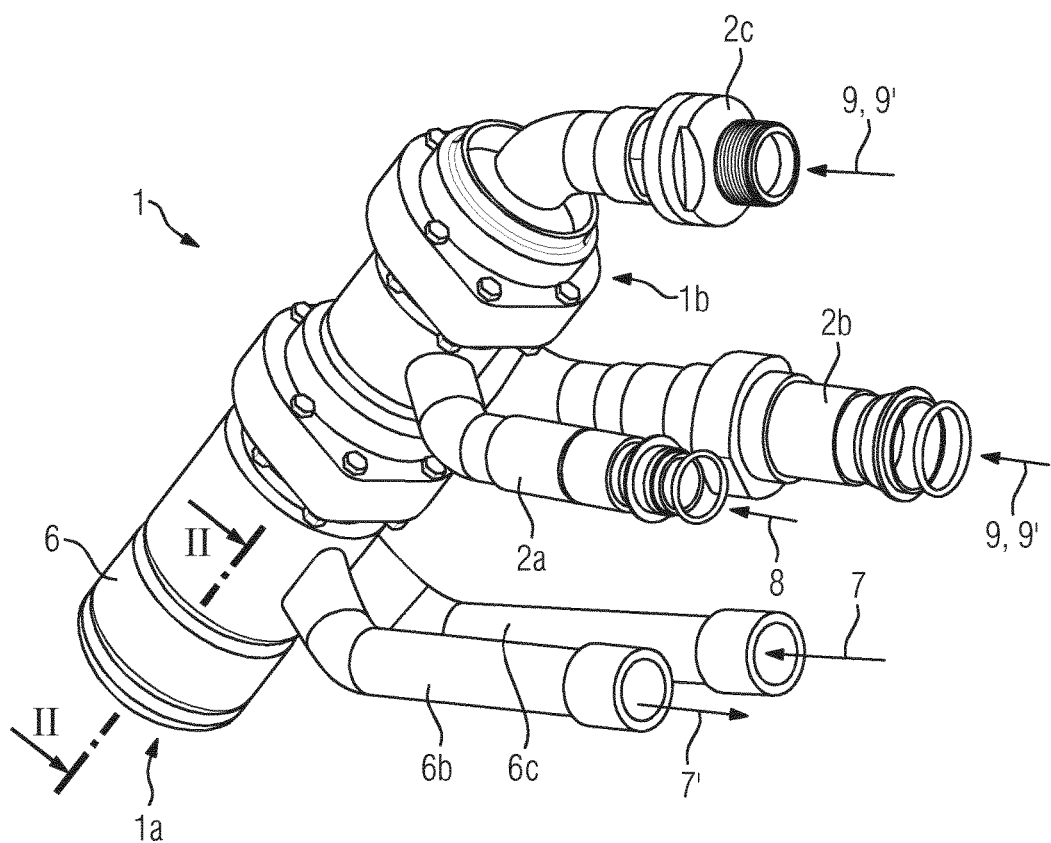
FIGS. 1 to 4 are to explain by way of example a burner-lance unit according to the invention and its use in a furnace. Therefore, in the drawing.

FIG. 1 shows a burner-lance unit 1 in a three-dimensional view. In this case, the burner lance unit 1 has a hot end 1a and a cold end 1b. The burner-lance unit 1 has a plurality of gas connections 2a for the feed of fuel 8 and 2b and 2c for the feed of combustion enabling gas 9 or inert gas 9'. When the unit 1 is in lance mode, a first gas, here preferably in the form of a combustion enabling gas here, oxygen, is injected at supersonic speed alternately with a second gas, here inert gas, preferably in the form of nitrogen. In burner mode, fuel 8 together with combustion enabling gas 9, here preferably in the form of oxygen, are combusted.

Figure 2:
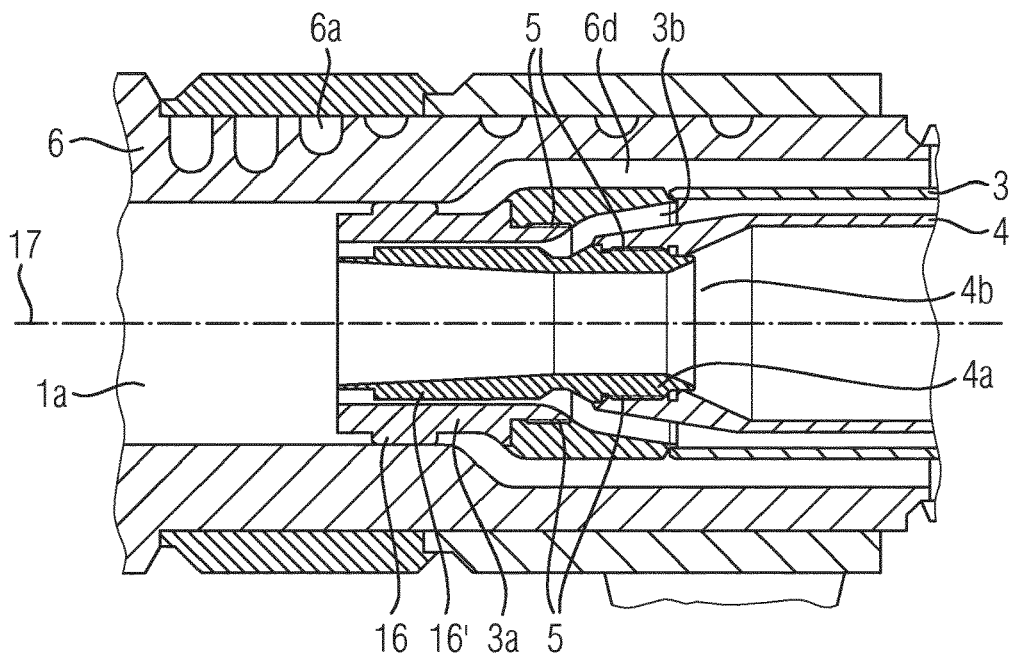

The burner-lance unit 1 also has a cooling tube 6 shown in FIG. 2 with cooling-medium passages 6a at its radially outward periphery and cooling-medium connections 6b, 6c, wherein a cooling medium 7, especially water, can be fed to the cooling tube 6. The cooling medium 7 protects the burner-lance unit 1 against overheating. Heated cooling medium 7' is discharged again from the cooling tube 6. In the region of the gas connection 2c, provision can be made for connections for measuring units, (not shown) such as temperature measuring units.

FIG. 2 shows a section II-II through the hot end 1a of the burner-lance unit 1 according to FIG. 1. Like designations identify the same elements as in FIG. 1. Now apparent in the cross-sectional view are the burner tube 3, the burner nozzle 3a which is arranged on the burner tube 3 by a first releasable connection 5, the lance tube 4 and also the de Laval nozzle 4a which is arranged on the lance tube 4 by a further second releasable connection 5. The releasable connections 5 in this case are constructed as screwed connections. The screwed connection between the burner tube 3 and the burner nozzle 4 comprises a male thread arranged on the burner nozzle 3a and a cooperating female thread arranged on the burner tube 3. The male thread and the female thread naturally interact. The male thread and consequently also the female thread extend concentrically around the longitudinal axis 17 of the lance tube 4. The screwed connection between the lance tube 4 and the de Laval nozzle 4a is constructed in a similar way. Also, the cooling-medium passages 6a provided in the cooling tube 6. A combustion enabling gas passage 6d is formed between the cooling tube 6 and the burner tube 3. A fuel passage 3b is formed between the burner tube 3 and the lance tube 4. Inside the lance tube 4, a lance passage 4b extends along the longitudinal axis 17 of the lance tube 4.

Figure 3:
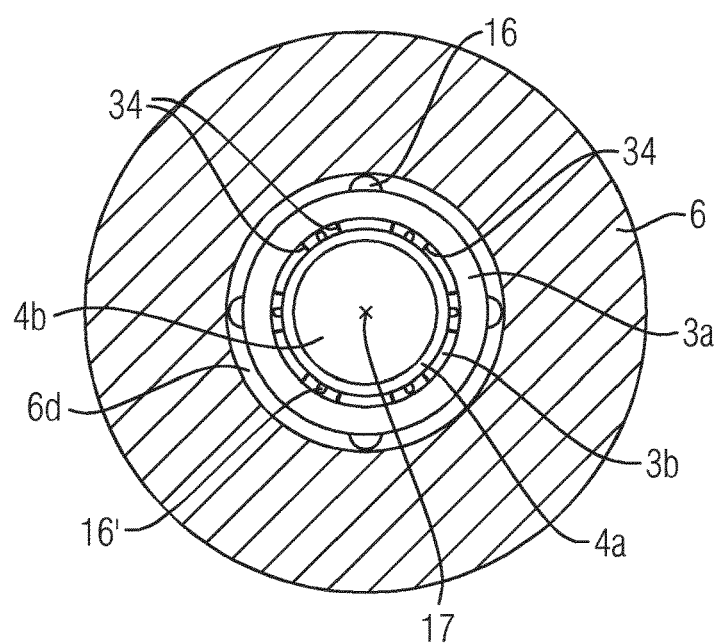

FIG. 3 shows the burner-lance unit 1 from FIG. 1 as seen in the direction of the longitudinal axis 17 of the lance tube 4. Like designations identify the same elements as in FIGS. 1 and 2. The burner nozzle 3a has projections 16 on its outside diameter. The de Laval nozzle 4a also has projections 16' on its outside diameter. When exchanging the burner nozzle 3a and/or the de Laval nozzle 4a, the projections 16, 16' are brought into engagement with a key unit and by means of this are rotated in relation to the burner tube 3 or the lance tube 4 and unscrewed. A new burner nozzle or a new de Laval nozzle can now be inserted and screwed down tight also using the key unit.

The burner tube 3 is retained in the cooling tube 6 in a clearance free manner or at least almost in a clearance free manner. For example, the projections 16 can be correspondingly dimensioned for this purpose. Similarly, the lance tube 4 is retained in the burner tube 3 in a clearance free manner or at least almost in a clearance free manner. For example, the projections 16' can be correspondingly dimensioned for this purpose.

Figure 4:
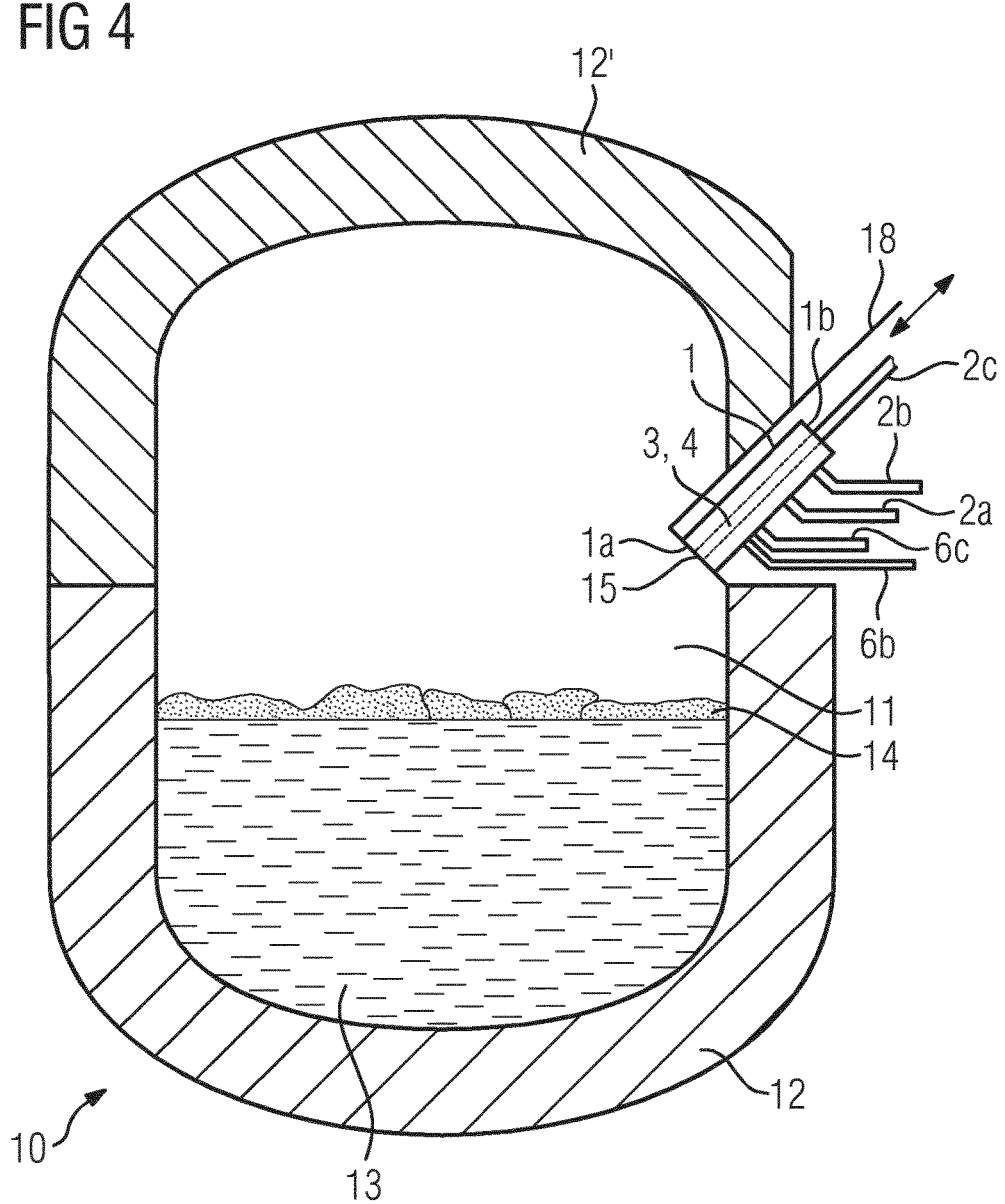

FIG. 4 schematically shows a furnace 10 with a burner-lance unit 1. Like designations identify the same elements as in FIGS. 1 to 3. The furnace 1 has a furnace chamber 11 which is enclosed by a furnace wall 12 and a furnace lid 12'. Located in the furnace chamber 11 is a molten metal 13 which is covered by a slag layer 14. The burner-lance unit 1 points by its hot end 1a in the direction of the furnace chamber 12, wherein the gas outlet ends 15 of burner tube 3 and lance tube 4, which in this case are only schematically indicated by a dashed line, also point towards the furnace chamber 11. The burner-lance unit 1 is in this case arranged on the outside on the furnace wall 12 or on the furnace lid 12' and, preferably in a simple manner, for example by an arrangement on a pivotable or displaceable panel 18, which can be brought from the installed position into a maintenance position in which the burner nozzle 3a and/or the de Laval nozzle 4a can be exchanged.

FIGS. 1 to 4 only show one possible embodiment of the burner-lance unit, but various further constructional forms can be realized. The furnace 10 and the arrangement of the burner-lance unit 1 on the furnace 10 are also selected only by way of example.

LIST OF DESIGNATIONS

1 Burner-lance unit
1a Hot end
1b Cold end
2a, 2b, 2c Gas connection
3 Burner tube
3a Burner nozzle
3b Fuel passage
4 Lance tube
4a De Laval nozzle
4b Lance passage
5 Releasable connection
6 Cooling tube
6a Cooling-medium passages
6b, 6c Cooling-medium connection
6d Combustible gas passage
7 Cooling medium
7' Heated cooling medium
8 Fuel
9, 9' Combustible gas or inert gas
10 Furnace
11 Furnace chamber
12 Furnace wall
12' Furnace lid
13 Molten metal
14 Slag layer
15 Gas outlet end
16, 16' Projection
17 Longitudinal axis
18 Panel
34 Rib

The invention claimed is:

1. A burner-lance unit for a furnace, for melting metal, the unit comprising:
at least two gas connections into the furnace;
a burner tube extending into the furnace and a lance tube extending into the furnace, the lance tube is arranged concentrically within the burner tube;
each of the burner tube and the lance tube having a respective gas inlet end and a gas outlet end;
a de Laval nozzle and a screwed connection for releasably connecting the de Laval nozzle to the lance tube;
a cooling tube in which the burner tube is arranged concentrically;
a burner nozzle of the burner tube encompassed by the cooling tube and a screwed connection releasably connecting the burner nozzle to the burner tube;
a cooling tube having cooling medium passages, and at least two cooling-medium connections to which the cooling-medium passages are connected;
projections on an outside diameter of the burner nozzle configured for, and retaining the burner tube in the cooling tube; and
projections on an outside diameter of the de Laval nozzle configured for, and retaining the lance tube in the burner tube;

wherein the screwed connection between the burner tube and the burner nozzle comprises a first male thread arranged on the burner nozzle and extending concentrically around a longitudinal axis of the lance tube, and a first female thread arranged on the burner tube and interacting with the first male thread, and the screwed connection between the lance tube and the de Laval nozzle comprises a second male thread arranged on the de Laval nozzle and extending concentrically around the longitudinal axis of the lance tube, and a second female thread arranged on the lance tube and interacting with the second male thread.

2. The burner-lance unit as claimed in claim 1, further comprising:

at least one of an outside diameter and at least one of an inside diameter of the burner nozzle or of the de Laval nozzle has, at least one of an indentation or a projection which is configured to be brought into engagement with a key unit for releasing at least one the burner nozzle and at least one of the de Laval nozzle from the other nozzle.

3. The burner-lance unit as claimed in claim 1, further comprising a gas passage for a combustion enabling gas and located between the cooling tube and the burner tube.

4. A metallurgical furnace, comprising a furnace chamber for melting of metal therein and having at least one burner-lance unit as claimed in claim 1, extending into the furnace, wherein the respective gas outlet ends of the burner tube and of the lance tube are arranged in a manner pointing into the direction of the furnace chamber.

5. The burner-lance unit as claimed in claim 1, wherein the de Laval nozzle and the burner nozzle are rigidly interconnected.

6. The burner-lance unit as claimed in claim 5, wherein the de Laval nozzle and the burner nozzle are rigidly interconnected with ribs.

* * * * *